(12) United States Patent
Daoud

(10) Patent No.: US 6,284,973 B1
(45) Date of Patent: Sep. 4, 2001

(54) STRAIN RELIEF

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/500,715

(22) Filed: Feb. 9, 2000

(51) Int. Cl.⁷ ........................................... H02G 3/18
(52) U.S. Cl. ........................... 174/65 R; 174/65 SS; 285/161; 285/322
(58) Field of Search ..................... 174/65 SS, 65 R, 174/74 A, 84 C, 93; 285/161, 256, 257, 319, 322, 323, 331; 403/326, 329

(56) References Cited

U.S. PATENT DOCUMENTS

| | | | |
|---|---|---|---|
| 3,476,412 | * 11/1969 | Demler | 285/322 |
| 4,145,075 | * 3/1979 | Holzmann | 285/161 |
| 4,250,348 | * 2/1981 | Kitagawa | 174/65 SS |
| 4,358,079 | * 11/1982 | Navarro | 174/65 R |
| 4,375,011 | * 2/1983 | Grunau | 174/65 SS |
| 4,600,803 | * 7/1986 | Holzmann | 174/65 SS |
| 4,739,126 | * 4/1988 | Gutter et al. | 174/65 SS |
| 4,767,135 | * 8/1988 | Holzmann | 285/322 |
| 4,787,657 | * 11/1988 | Henniger | 285/323 |
| 5,048,872 | * 9/1991 | Gehring | 285/322 |
| 5,679,926 | * 10/1997 | Maloney et al. | 174/65 R |
| 5,927,892 | * 7/1999 | Teh-Tsung | 285/322 |
| 6,162,995 | * 12/2000 | Bachle et al. | 174/65 R |

* cited by examiner

Primary Examiner—Dean A. Reichard
Assistant Examiner—Adolfo Nino
(74) Attorney, Agent, or Firm—Stroock & Stroock & Lavan LLP

(57) ABSTRACT

A new device and method for providing strain relief to a cable including a base with a tubular extension, the tubular extension having a plurality of deflectable arms, each of which are radially converged and constricted about a cable under a compression force caused by the tightening of a nut having a tapered region formed in an inner nut channel.

11 Claims, 4 Drawing Sheets

STRAIN RELIEF

FIELD OF THE INVENTION

This invention relates to a device for providing strain relief to jacketed cables. In particular, the invention is directed to a strain relief device for securing jacketed cables of variable diameters carrying tip ring wire pairs to telephone junction boxes for distribution to telephone equipment.

BACKGROUND OF THE INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs enter the building as part of a multi-conductor cable, the individual tip ring wire pairs must first be broken out from the cable into individual wire pairs. This is normally accomplished in a junction box known as, for example, a building entrance protector (BEP), or network interface unit (NIU).

The multi-conductor cables are generally enclosed in stiff insulation jackets halving variable diameters depending upon the particular application. Because these multi-conductor cables carry the tip ring wire pairs that will be connected to various types of telephone equipment, it is necessary to provide strain relief to the cable to insure that the tip ring wire pairs do not become disconnected or loose. Loose or disconnected wires in a junction box can cause serious and hard to find malfunctions in telephone service, which requires costly repair and maintenance service.

Presently, however, there are no efficient means for securing multi-conductor cables of variable diameters or shapes in the BIP or NIU. Thus, there is a need for a strain relief device capable of securing multi-conductor cables of variable diameters.

SUMMARY OF THE INVENTION

The present invention is directed at overcoming shortcomings in the prior art. The present invention comprises a base mountable to a fixed object (not shown), such as a BEP or NIU. A tubular extension extends longitudinally from the base and has a compressible portion for constricting around and, thereby, securing a cable. A nut is mountable over the tubular extension and has an inner channel provided with a tapered region for constricting the compressible portion of the tubular extension.

The operation of mounting the nut over the tubular extension causes the tapered region of the nut to exert a compression force on the compressible portion, which deflects the compressible portion inward. In use, a cable to be strain relieved is passed through the tubular extension, and the nut is mounted onto the tubular extension to provide strain relief. As the compressible end portion is constricted an inner surface of the compressible portion contacts the cable and grippingly secures the cable in place. Because the compressible portion can be gradually compressed by the nut to a desired compression, a range of variable diameter cables can be secured by the present invention. Thus, the need to use cable fastening devices constructed for specific cable diameters is eliminated, thereby improving efficiency and reliability in cable connections.

In a preferred embodiment, the compressible portion is comprised of a plurality of deflectable arms having gripping ends. Under a compression force, the gripping ends radially converge and secure the cable.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the figures, which are not to scale, and which are merely illustrative, and wherein like reference numerals depict like elements throughout several views.

DETAILED DESCRIPTION OF THE PREFERRED EMBODIMENTS

Figure 1:
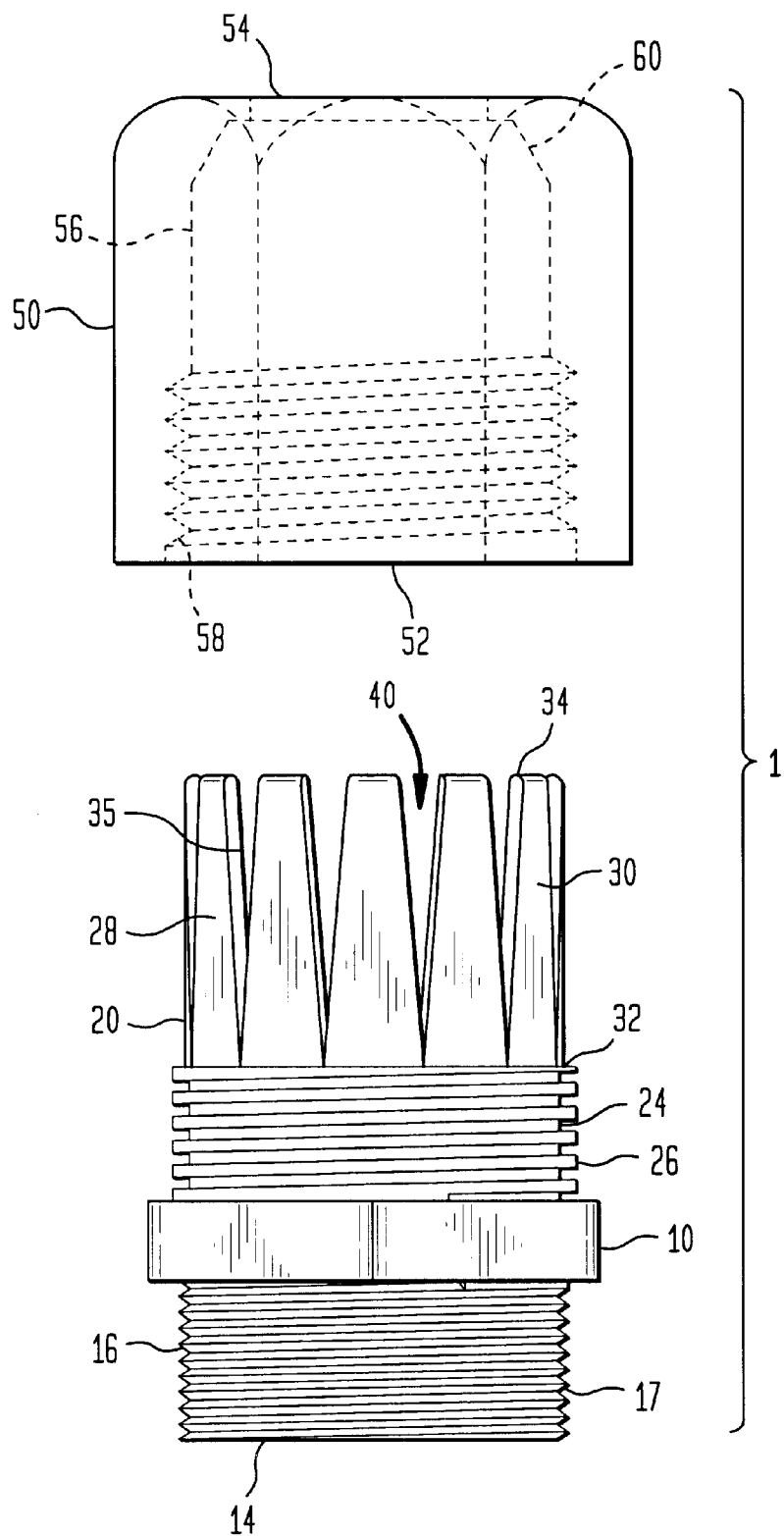
FIG. 1 is a side view of a strain relief device in accordance with the present invention.

Referring to FIGS. 1 to 4, there is shown a strain relief device 1 constructed in accordance with the present invention. Strain relief device 1 comprises a base 10 mountable to a fixed object and constructed for receiving therein a cable, not shown, of the type generally used in connection with telephone wiring. Strain relief device 1 further comprises a tubular extension 26 that extends longitudinally from base 10. Tubular extension 20 has a male screw thread 26 on outer surface 24 and a compressible portion 28 for grippingly securing a cable.

Nut 50, which is constructed to cause compressible portion 28 to grip a cable, has a female screw thread 58 formed on at least part of inner channel 56 located nearest first end 52. Female screw thread 58 is constructed to threadingly engage male screw thread 26 of tubular extension 20. Inner channel 56 is further provided with a tapered region 60 sloping inwardly towards second end 54. One skilled in the art will recognize that the present invention is capable of being utilized in any number of applications, such as, by way of non-limiting example, securing multi-conductor cables in BEPs and NIUs.

With reference to FIG. 1, base 10 is constructed to mount to a fixed object, such as a BEP or NIU. Base 10 has a polygonal cross-section, such as, by way of non-limiting example, a hexagonal cross-section, to facilitate screwing base 10 into a structure as described below.

In a first embodiment, base 10 is provided with mounting portion 14 having a threaded portion 16 on an outer surface 17 for engaging the threaded portion of an aperture formed in a BEP or NIU, such that the tip ring wires carried within the cable can be distributed throughout the BEP or NIU or other structure. In use, a wrench or other tool is used on the hexagonal base 10 to tighten mounting portion 14 onto a structure.

Figure 2:
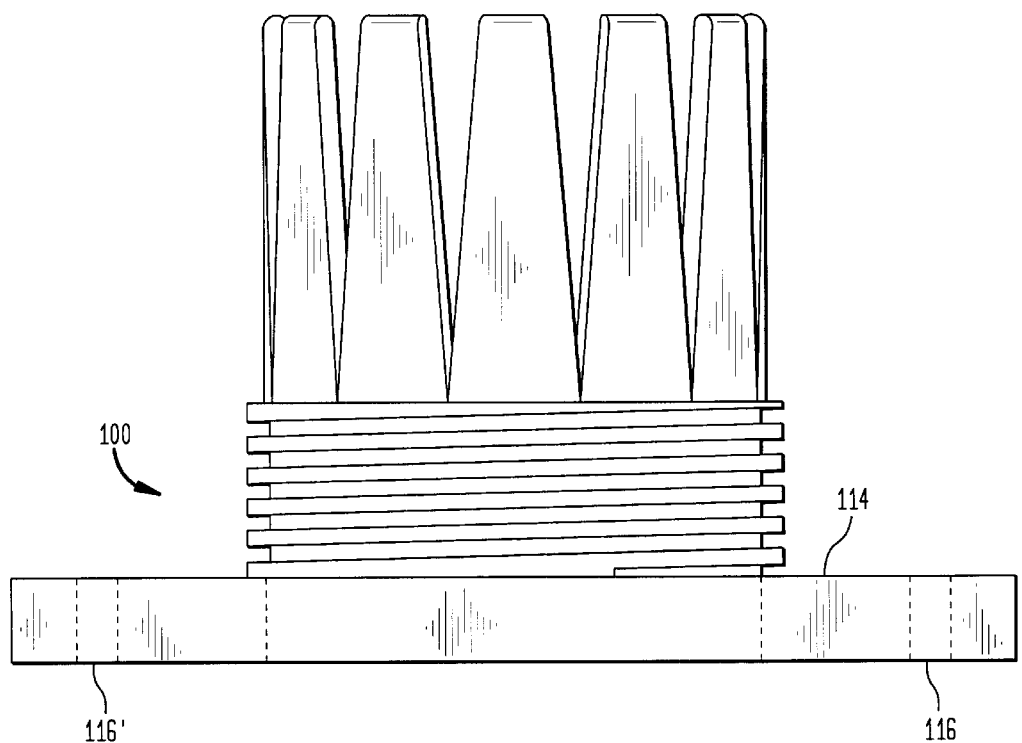
FIG. 2 is a side view of a second embodiment of the device of FIG. 1.

Referring to FIG. 2, in a second embodiment, base 100 has a mounting portion 114 which is preferably disc-shaped, although one skilled in the art will recognize that the shape used is a matter of design choice and that any shape may be substituted. As depicted in FIG. 2, mounting portion 114 is provided with a plurality of mounting apertures 116, 116'. In use, a nail or screw, or any other type article commonly used to mount and object, can be driven through mounting apertures 116 to mount base 100 to a fixed object. One skilled in the art will recognize that mounting apertures are not necessary and that mounting portion 114 can be mounted if any manner known in the art, including, adhesives, welding, and the like.

Further, one skilled in the art will recognize, that base 10 can be mounted to a structure in any manner known in the art, including but not limited to, snap-fitting, friction fitting, adhering, or integrally forming strain relief device 1 with the BEP or NIU or other structure.

With further reference to FIG. 1, base 10 is provided with tubular extension 20, which extends longitudinally from base 10 and opposite mounting portion 14. Tubular extension 20 preferably has a male screw thread 26 formed on outer surface 24 of tubular extension 20 for matingly engaging internal female screw thread 58 of nut 50, as discussed further below.

One skilled in the art will recognize, however, that mounting nut 50 over tubular extension 20 via the mating engagement of threaded regions is but one manner in which the mounting may be accomplished. Nut 50 may, by way of non-limiting example, be snap fit, friction fit, or fit in any other way to achieve the compression of tubular extension 20 and the securement of nut 50 over tubular extension 20.

Tubular extension 20 preferably is formed of a durable, flexible material, such as, plastic. In a preferred embodiment, compressible portion 28 of tubular extension 20 comprises a plurality of deflectable arms 30, which define compressible portion 28. Each arm 30 is tapered such that each arm 30 is wider at base 32 and thinner at gripping end 34. The taper results in ends 34 being freely spaced. Because ends 34 are freely spaced, ends 34 can be deflected inward causing gripping ends 34 to radially converge until arms 30 meet. An inner surface 35 of deflectable arms 30 collectively define a channel 40 through which a cable is passed and secured, as described further below.

With reference to FIG. 1, there is shown a preferred embodiment of nut 50 for use with the present invention. Nut 50 is preferably a hexagonal nut, although any type of nut generally known in the art may be utilized. Nut 50 preferably has a generally cylindrically shaped inner channel 56 provided with an internal female screw thread 58 nearest to first end 52 for connection to the corresponding male screw thread 26 of tubular extension 20. As stated above, nut 50 may be fit over tubular extension 20 in any manner that achieves compression and securement. Inner channel 56 has a tapered region 60 nearest to second end 54 and adjacent to female screw thread 58. Tapered region 60 slopes inwardly towards second end 54. The particular angle of tapered region 60 is a matter of design choice and is subject to the specific application for which the present invention is utilized.

Figure 3:
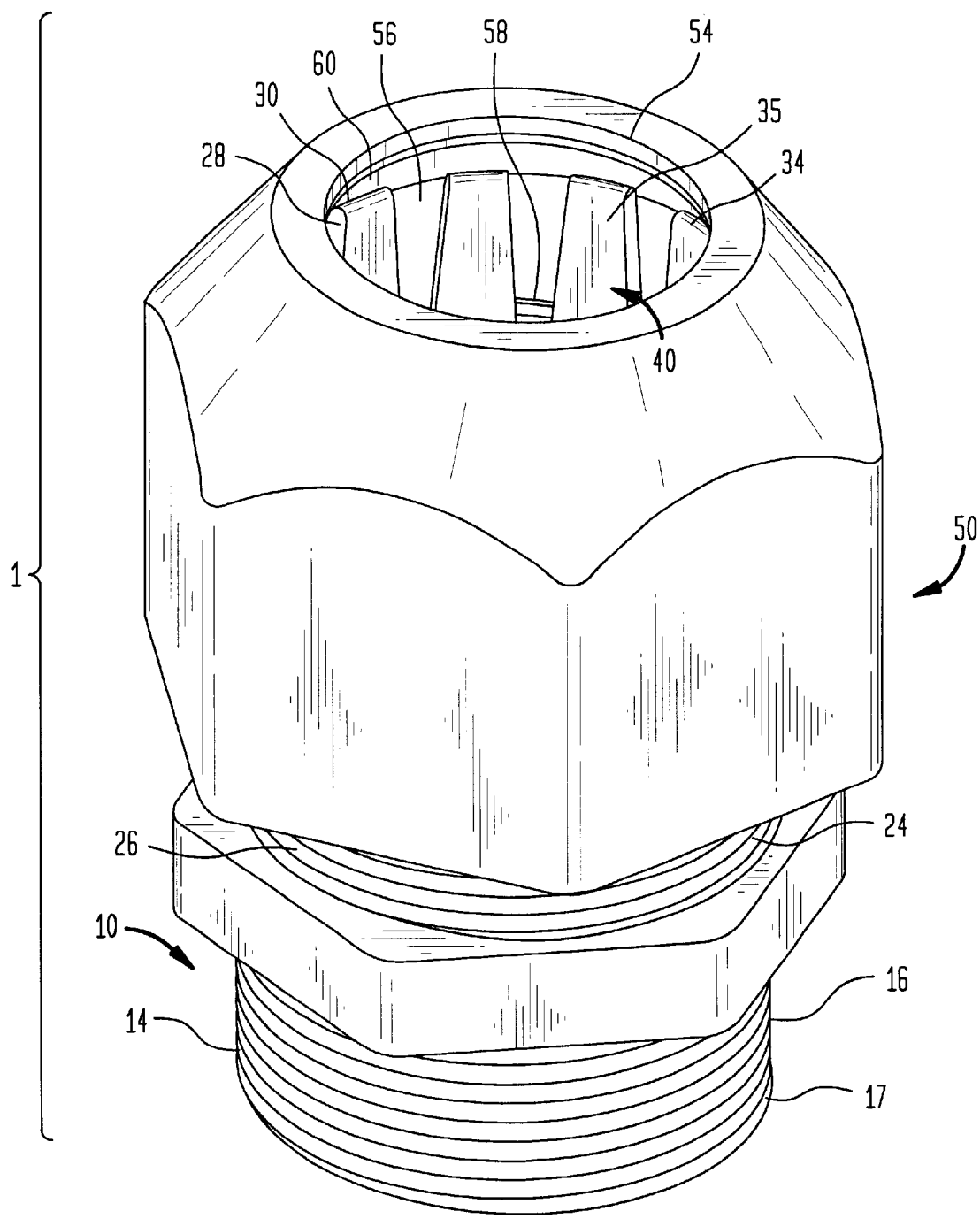
FIG. 3 is a perspective view of the device in FIG. 1, wherein the compressible end is in an uncompressed ate.
Figure 4:
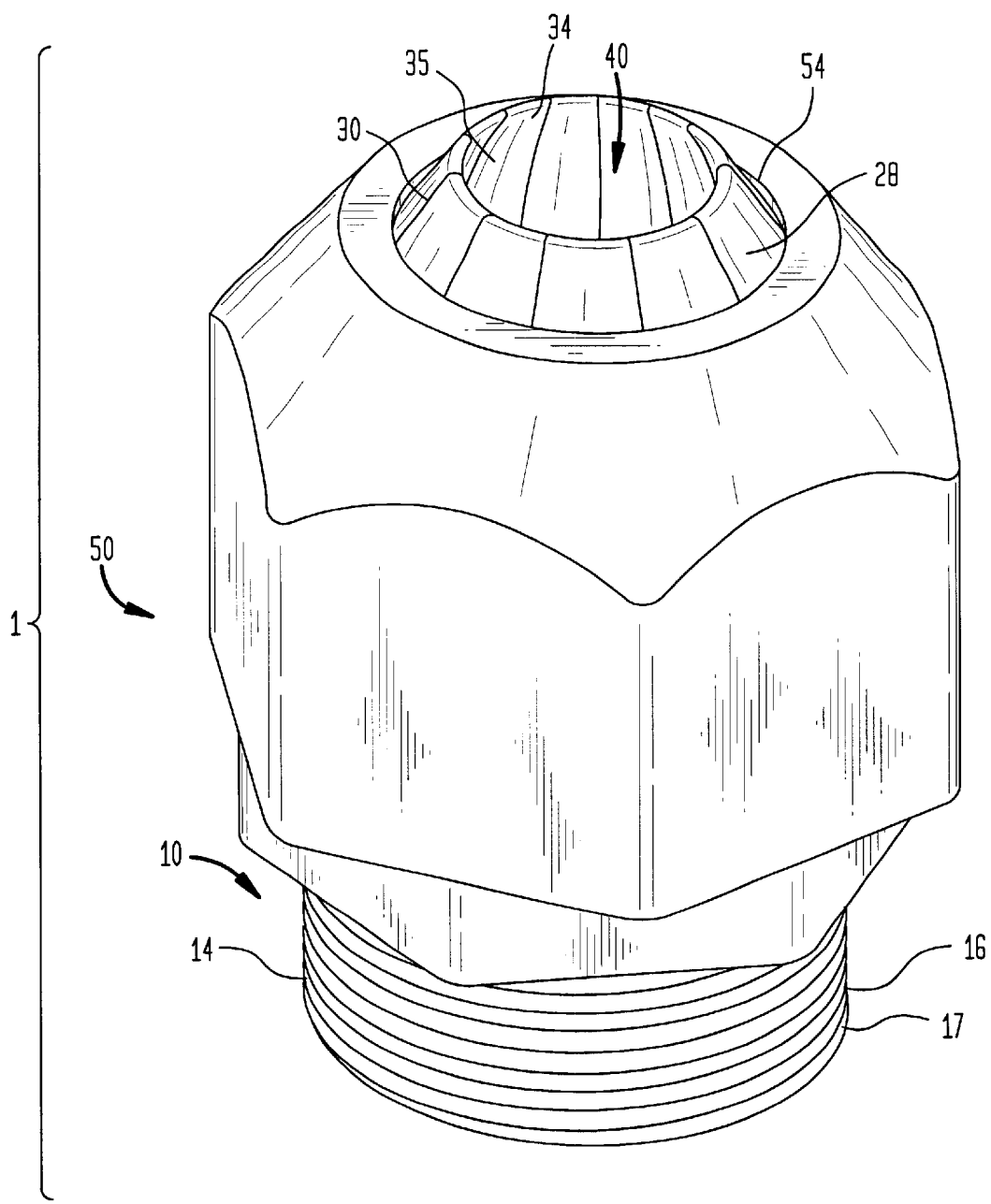
FIG. 4 is a perspective view of the device in FIG. 1, wherein the compressible end is in a compressed state.

With reference now to FIGS. 3 and 4, there is shown nut 50 mounted onto tubular extension 20 through the mating engagement of female screw thread 58 of nut 30 with male screw thread 26 of tubular extension 20. As depicted in FIG. 3, nut 50 is in a first position wherein the plurality of deflectable arms 30 of compressible portion 28 are in an uncompressed state. In an uncompressed state, channel 40, which is defined by inner surfaces 35 of plurality of deflectable arms 30, is at its maximum diameter. In this state, a cable may be slid into and through channel 40. The operation of tightening nut 50 causes tapered region 60 to contact deflectable arms 30 forcing gripping ends 34 to converge radially inward. This inward constriction results in the gradual decrease in the diameter of channel 40. As depicted in FIG. 4, when second nut 50 is fully tightened, deflectable arms 30 of compressible portion 28 are fully constricted and the diameter of channel 40 is at a minimum. The gradual convergence of gripping ends 14 and the reduction in diameter of channel 40 causes gripping ends 34 to make gripping contact with the inserted cable or conduit, thereby securing the cable.

Because the tightening of nut 50 causes compressible portion 28 to gradually compress until reaching a fully compressed state, a multitude of cable diameters can be secured by adapter 1. The diameters of cables used with the present invention can range from the maximum diameter of channel 40 in an uncompressed state to the minimum diameter of channel 40 in a ally compressed state. One skilled in the art will recognize, however, that the respective compressed and uncompressed diameters of channel 40 are a matter of design choice and may be varied to accommodate difference ranges of cable diameters depending upon the particular application.

In a preferred embodiment, gripping ends 34 are formed with non-flat surfaces for enhancing gripping ends 34 frictional engagement with a cable. Gripping ends 34 may also be provided with grooves or notches, which serve the same general purpose as non-flat surfaces. One skilled in the art will recognize that gripping ends 34 may be modified in any number of ways to improve the gripping strength of gripping ends 34.

Further, one skilled in the art will recognize that strain relief device 1 is not limited to the uses described herein, but may be used in applications pertaining to any field where there is a need to secure cables or other elongate members.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A device for providing strain relief to cables of varying diameters, comprising:

a base;

a tubular extension extending longitudinally from a first end of said base, said tubular extension comprising a plurality of arms inwardly deflectable under a compression force, each of said arms having a taper of decreasing width from said first end of said base to an opposite end of said arms; and a nut having an inner channel, said nut having a first end and a second end, said inner channel having a tapered region formed such that mounting sail nut over said tubular extension forces said plurality of arms to constrict around a cable insertable within said tubular extension.

2. The device of claim 1, wherein said tubular extension has a threaded portion on an outer surface and said inner channel of said nut is at least partially threaded to matingly engage said threaded portion of said tubular extension.

3. The device of claim 2, wherein said compressible portion further comprises a plurality of arms inwardly deflectable under a compression force.

4. The device of claim 3, wherein each of said plurality of arms has a gripping end.

5. The device of claim 4, wherein said gripping ends are formed with non-flat surfaces configured for enhanced frictional engagement with said cable.

6. The device of claim 4, wherein said gripping ends are notched.

7. The device of claim 4, wherein said gripping ends are grooved.

8. The device of claim 1, wherein said base further comprises a mounting portion on a second end opposite said first end.

9. The device of claim 8, wherein said mounting portion is substantially cylindrical and has a threaded region.

10. A junction box, comprising:
 a wall having an aperture;
 a strain relief device mounted to said wall and positioned in overlying relationship to said aperture of said wall, said strain relief device having a base, a tubular extension extending longitudinally from a first end of said base, said tubular extension comprising a plurality of arms, each of said arms having a taper of decreasing width from said first end of said base to an opposite end of said arms, and a nut having an inner channel, said inner channel having a tapered region formed such that mounting said nut over said tabular extension forces said plurality of arms to constrict around a cable insertable within said tubular extension.

11. A method for grippingly securing a cable, comprising the steps of:
 inserting a cable into a tubular portion of a body o f a strain relief device, said tubular portion having a plurality of deflectable arms compressible by a nut mountable over said tubular portion, said arms each having a taper of decreasing width from a base of said arms to an end of said arms, and said nut having an inner channel with a tapered region; and
 tightening said nut over said tubular portion, such that said deflectable arms are deflected radially inward to grippingly secure said cable.

\* \* \* \* \*